United States Patent
Langnickel et al.

(10) Patent No.: US 10,024,672 B2
(45) Date of Patent: Jul. 17, 2018

(54) NAVIGATION COMMUNICATION DEVICE AND METHOD

(71) Applicant: VOLKSWAGEN AG, Wolfsburg (DE)

(72) Inventors: Mirko Langnickel, Berlin (DE); Budianto Liong, Berlin (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/031,340

(22) PCT Filed: Oct. 23, 2013

(86) PCT No.: PCT/EP2013/072209
§ 371 (c)(1),
(2) Date: Apr. 22, 2016

(87) PCT Pub. No.: WO2015/058798
PCT Pub. Date: Apr. 30, 2015

(65) Prior Publication Data
US 2016/0258768 A1    Sep. 8, 2016

(51) Int. Cl.
| | |
|---|---|
| G01C 21/34 | (2006.01) |
| G06Q 10/10 | (2012.01) |
| H04M 1/725 | (2006.01) |
| H04W 4/02 | (2018.01) |
| H04W 4/029 | (2018.01) |
| G01C 21/00 | (2006.01) |
| G06F 15/16 | (2006.01) |

(52) U.S. Cl.
CPC ..... *G01C 21/3438* (2013.01); *G06Q 10/1095* (2013.01); *H04M 1/72572* (2013.01); *H04W 4/023* (2013.01); *H04W 4/029* (2018.02)

(58) Field of Classification Search
CPC ............................ G01C 21/3438; G01C 21/34

USPC ................... 701/522, 207; 709/229
See application file for complete search history.

(56) References Cited

U.S. PATENT DOCUMENTS

| | | | | |
|---|---|---|---|---|
| 2004/0254721 | A1* | 12/2004 | Saiki | G01C 21/3438 701/410 |
| 2011/0113148 | A1* | 5/2011 | Salmela | G01C 21/3438 709/229 |
| 2014/0006518 | A1* | 1/2014 | Sinkov | H04L 51/32 709/205 |

FOREIGN PATENT DOCUMENTS

| | | |
|---|---|---|
| CN | 1764826 A | 4/2006 |
| CN | 101408433 A | 4/2009 |
| DE | 102006034413 A1 | 1/2008 |
| EP | 1434032 A1 | 6/2004 |
| WO | 2008012175 A1 | 1/2008 |
| WO | 2011055005 A1 | 5/2011 |

OTHER PUBLICATIONS

Search Report for International Patent Application No. PCT/EP2013/072209; dated Jul. 24, 2014.

* cited by examiner

*Primary Examiner* — Mahmoud S Ismail
(74) *Attorney, Agent, or Firm* — Barnes & Thornburg LLP

(57) ABSTRACT

A navigation method in a first communication device including determining a meeting place for the first communication device and at least one second communication device, according to present location and user preference of respective communication device, and setting a navigation route from the present location of the first communication device to the determined meeting place.

17 Claims, 4 Drawing Sheets

//NAVIGATION COMMUNICATION DEVICE AND METHOD

PRIORITY CLAIM

This patent application is a U.S. National Phase of International Patent Application No. PCT/EP2013/072209, filed 23 Oct. 2013, the disclosure of which is incorporated herein by reference in its entirety.

FIELD

Illustrative embodiments relate to an automotive vehicle, and more particularly, relate to a navigation communication device and method for the automotive vehicle.

BACKGROUND

Generally, vehicle communication systems use a combination of various telecommunication technologies, such as global positioning system (GPS) technology, wireless cellular communication technology, local area network (LAN) technology etc., to communicate between vehicles and service centres and between vehicle users. Such vehicle communication system enables a wide variety of services to be provided to vehicle users, including vehicle navigation, maintenance, emergency service and so on.

For the vehicle navigation service, such communication system enables communication for multiple vehicle drivers, such as setting a meeting place automatically and quickly, for users who drive their cars to meet each other by communicating with each other using in-car navigation devices installed.

The current location based appointment service includes several steps for arranging meeting position (Point of Interest (POI)) between a plurality of wireless device users, determining location of wireless devices and navigation information to the meeting position (POI), and providing navigation information to wireless devices so as to guide users to the meeting position (POI).

However, the conventional navigation system simply extracts a meeting place to be reached fastest based on locations of the vehicles that will meet together, so that the selected meeting place is not always suitable for the vehicles to meet. So it is still desirable to come up with a vehicle communication system and communication method thereof that can implement the communication between vehicle users friendly and smoothly.

SUMMARY

Disclosed embodiments provide a navigation method in a first communication device, comprising: determining a meeting place for the first communication device and at least one second communication device, according to present location and user preference of respective communication device, and setting a navigation route from the present location of the first communication device to the determined meeting place.

Disclosed embodiments also provide a navigation communication device in a vehicle comprising: a transceiver for communicating of a meeting place with at least one communication device, and a processor for determining the meeting place for the vehicle and the at least one communication device according to present locations and user preferences thereof, and setting a navigation route from the present location of the vehicle to the determined meeting place.

Disclosed embodiments also provide a service center for providing navigation service in a communication system, comprising: a transceiver for communicating of a meeting place for at least two communication devices in the communication system, and a processor for determining the meeting place for the at least two communication devices according to present locations and user preferences thereof.

BRIEF DESCRIPTION OF THE DRAWINGS

The disclosed embodiments will be explained in detail below in connection with the accompanying drawings.

DETAILED DESCRIPTION OF THE DISCLOSED EMBODIMENTS

A description will now be given with reference to the attached figures to illustrate the disclosed embodiments.

Figure 1:
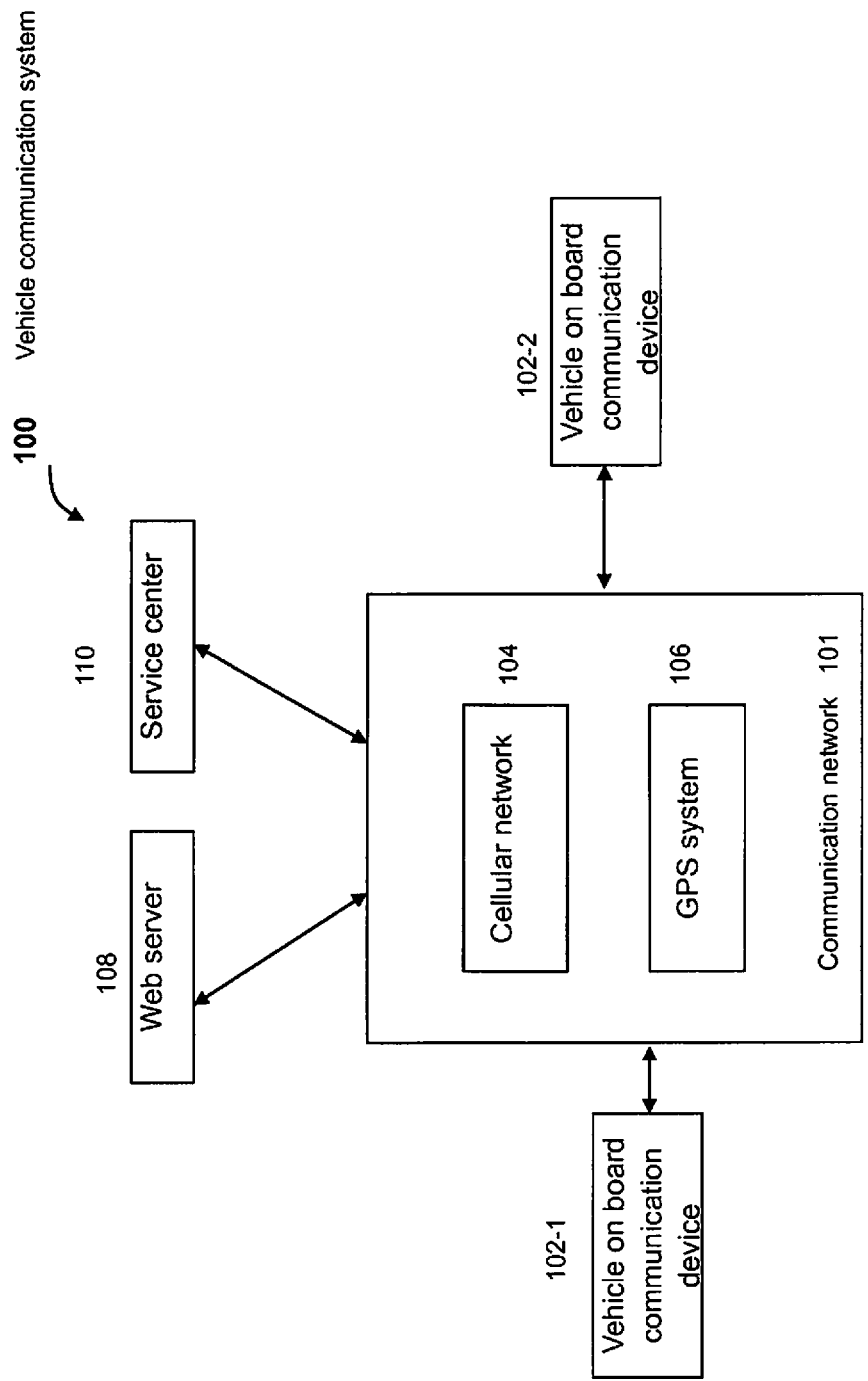
FIG. 1 is a schematic block diagram illustrating an example of a vehicle communication system according to a disclosed embodiment.

FIG. 1 is a schematic block diagram illustrating an example of a vehicle communication system 100 according to a disclosed embodiment. As shown in FIG. 1, the exemplary vehicle communication system 100 includes vehicle on board communication devices 102-1, 102-2, . . . 102-n installed in a plurality of vehicles respectively, a communication network 101 including cellular network 104 and a GPS system 106, a web server 108 and a service center 110. The vehicle on board communication device 102 facilitates communication and interaction of the vehicles or vehicle drivers, and the communication and interaction of the vehicles with various remote locations including the web server 108 and the service center 110, via a communication link of the cellular network 104 and the GPS system 106. It is known to one skilled in the art that the positioning system is not limited to GAS system, but can be a positioning system like Galileo, Glonast and the positions are obtained by triangulation of many mobile phone cells.

The cellular network 104 may include an analogue or digital cellular network, wireless computer network such as a wide area network, wireless local area network and so on, which are used for transmitting information between the vehicles and various remote locations. In at least one disclosed embodiment, the cellular network 104 is implemented as a CDMA or GSM cellular communication network. The GPS system 106 includes satellite transceiver and satellites for transmitting radio signals to the vehicles and the service center 110.

The service center 110 can be a call center or a network center for communicating with the vehicles via the communication network 101, and includes one or more locations to handle calls or messages from the vehicles or the vehicle users, and to monitor various vehicle conditions. Suitable service center facilities are known and currently in use to provide remote assistance by human advisors or automatic response device.

The web server 108 enables vehicle users to access websites and other contents over the Internet, by inputting an instruction from a keyboard, or by voice using speech recognition technology, or even by gesture using a gesture recognition technology and so on. The web server 108 will provide suitable information from the website according to the request from the vehicle users.

Figure 2:
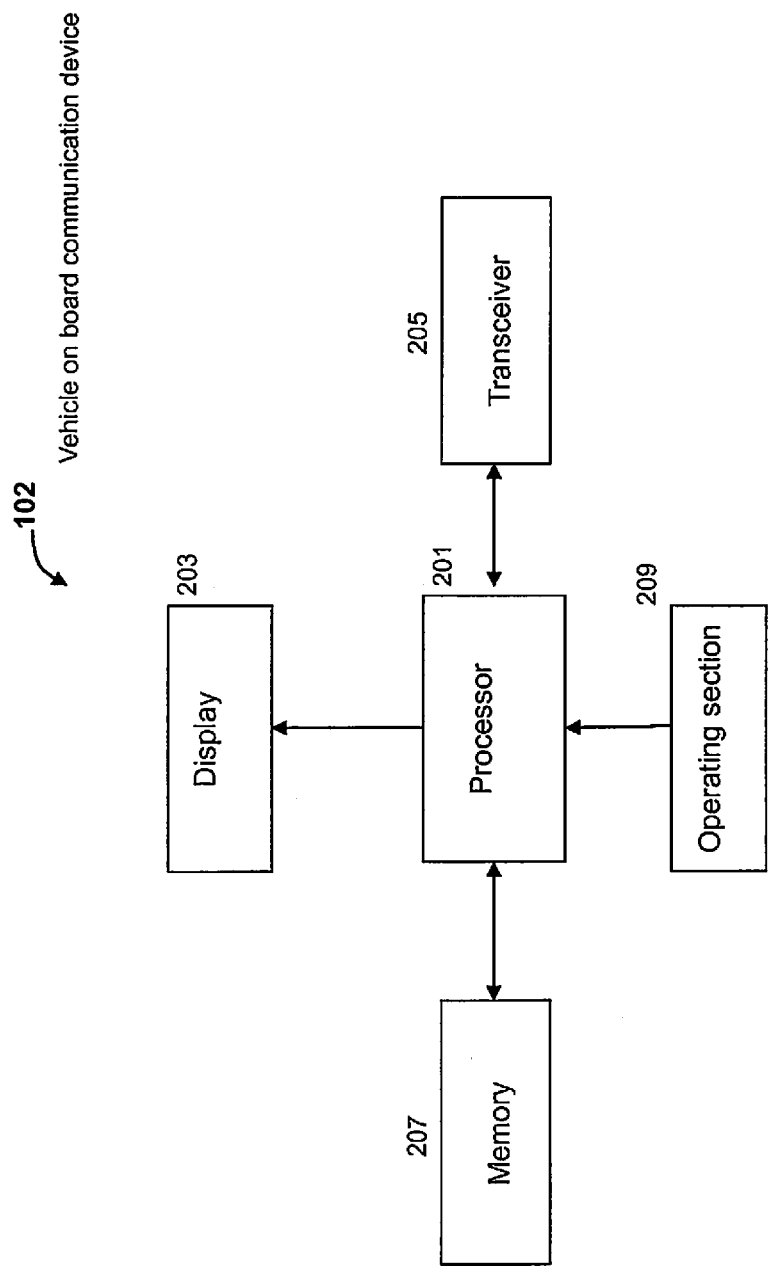
FIG. 2 is a block diagram showing a vehicle on board communication device for communicating with the outside communication system according to a disclosed embodiment.

FIG. 2 is a block diagram showing a vehicle on board communication device 102 for communicating with the outside wireless communication system according to a disclosed embodiment. As shown in FIG. 2, the vehicle on board communication device 102 can be implemented in any suitable configuration and may comprise a processor 201, a transceiver 205 for communicating to and from other vehicle navigation communication units or any other mobile communication devices via one or more antennas (not shown), an operating section 209 for inputting the user instructions, a display 203 for displaying information to vehicle user and a memory 207 for storing program and information.

The processor 201 is implemented in any of ways known to those skilled in the art, such as a controller, microprocessor, microcontroller and so on. The processor 201 executes the one or more computer programs stored in the memory 207, such as to carry out various functions of monitoring and processing the communication between the vehicle and the other communication devices, that is, the communication with any communication devices including navigation communication unit in vehicles, and mobile communication devices. According to a disclosed embodiment, optionally the processor 201 is a navigation controller, which reads map and transportation information in the memory 207 around the present vehicle location got from the GPS system 106, displays the map of the present vehicle location on the display 110, determines a meeting place with at least one other communication device according to present location and user preference of respective communication device, sets a navigation route from the present location of the vehicle to the determined meeting place, and displays automatically the routes to the destination input by the vehicle user.

The transceiver 205 provides wireless communication via cellular, satellite or other wireless path and facilitates both voices and data communications via the antenna. For example, the transceiver 205 may transmit and receive voice and data to and from the communication network 101 so that the vehicle on board communication device 102 can communicate with the web server 108 and the service center 110. In addition, the transceiver 205 also includes GPS communication and signal processing software and equipment for communicating of a meeting place with at least one other communication device by receiving user preference from the at least one other communication device, receiving location and time data from the communication network 101 so that the vehicle on board communication device 102 can carry out services such as navigation, driving directions and emergency services.

The operating section 209 is used for inputting information such as destination, transit place and a variety of instruction so as to initiate the communication with remote locations such as the web server 108 and the call center 110 by the input instruction or by voice. The operating section 209 may include tactile devices such as pushbutton switches, keyboards; microphone or any other input device.

The voice instruction of the vehicle user can be interpreted using a suitable voice recognition processing software.

The display 203 is used to display video or text information to the vehicle user, and may also include a speaker for outputting audio or voice communication with the remote locations.

Figure 3:
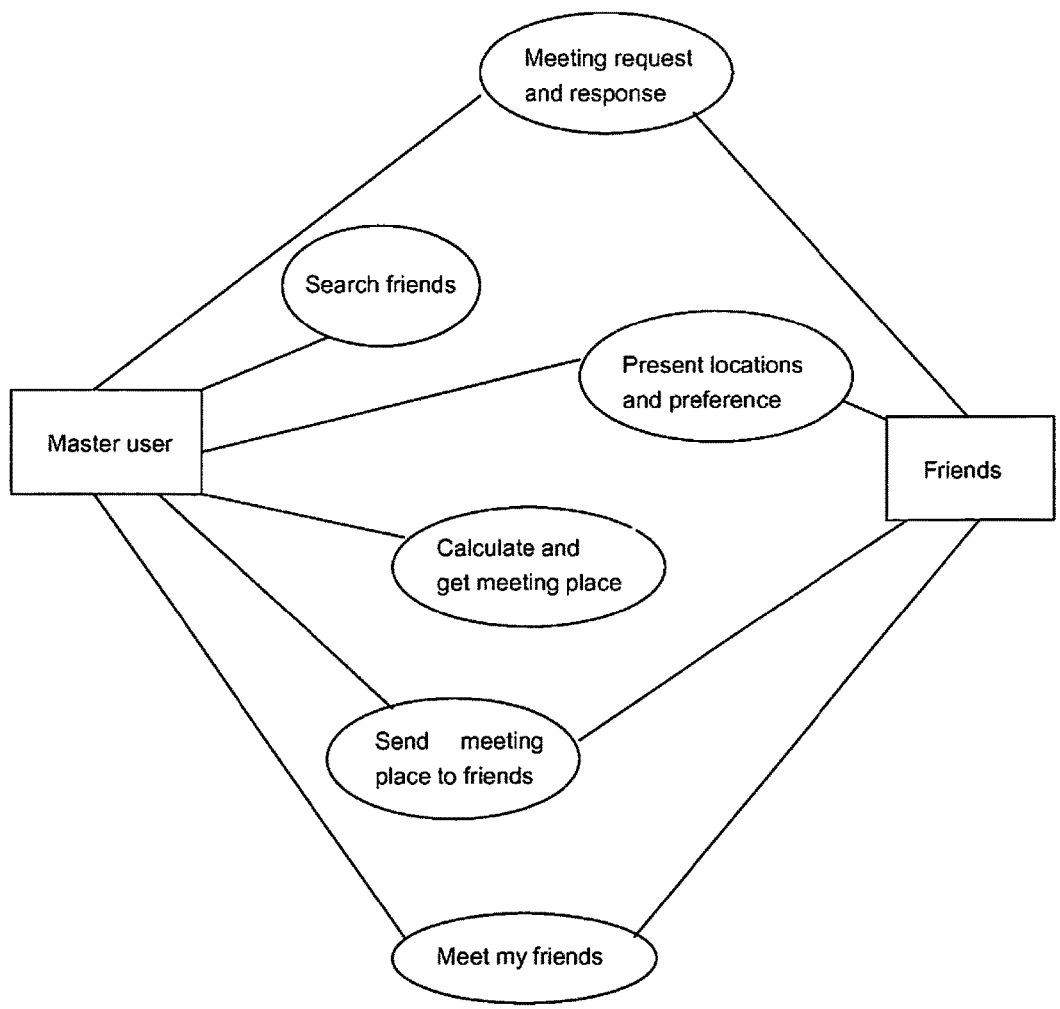
FIG. 3 is an illustrative diagram for a vehicle communication method according to a disclosed embodiment.

FIG. 3 is an illustrative diagram for a vehicle communication method according to a disclosed embodiment. In the disclosed embodiment, the vehicle communication system 100 is adapted to set a meeting place suitable for two or more vehicles to meet each other, for example, the vehicle user and his/her friends as shown in FIG. 3. Here the friends can be another vehicle user or a user of a mobile communication device with navigation function.

According to a disclosed embodiment, the transceiver 205 of the vehicle on board communication device 102 obtains transportation information of vehicles, pedestrians, bikes, public transport including trains and buses etc., information of traffic jam on road, information of road works, and jam information at stations, bus stops, and parking lots registered in advance. Optionally, the foregoing information can be obtained via radio communication between transceiver 205 and the service center 110.

When a vehicle user with a first vehicle on board communication device 102-1 wants to meet his/her friends with at least one second vehicle on board communication device 102-2, a communication instruction including a meeting request will be input by the vehicle user via the operating section 209, so that communication links with the friend(s) can be created by the vehicle communication system 100. The first vehicle on board communication device 102-1 can also search his/her friends from friend list saved in the memory 207.

The vehicle on board communication device 102 with a navigation function will be master vehicle for communication to provide the meeting point and the route guidance navigation, and the other vehicles will be slave device. Alternatively these vehicle users may select any one of the vehicles to be the master vehicle. Optionally, a vehicle user of a calling party can be automatically master user, and the called parties can be automatically slave users.

The communication instruction input by the master user may include pressing a button to launch a meeting request with a specific user, selecting one or more friends on a display to launch a meeting request, or calling the service center 110 to request meeting service with one or more friends. The communication of the master user for the meeting place with the at least one friend with mobile communication device is implemented by the transceiver 205, including, sending a meeting request to the at least one friend, and receiving a corresponding response, or receiving a meeting request from one of the at least one friend, and responding to accept the meeting request.

When the one or more friends with navigation device make a response to the meeting request, their present locations can be sent to the master user. The present locations of the mobile communication devices are obtained from the GPS system 106 by the master user, or are received from the at least one friend.

These received location information and location of the master user are stored in the memory 207 of the vehicle on board communication device 102. The processor 201 of the vehicle on board communication device 102 calculates and creates a tentative meeting area in a bounding box based on the user preference, user selection, user instruction, or information of other's locations and the present location itself. For example, the tentative meeting area is an area with substantially the same distance to respective communication device, an area that all communication devices can arrive quickly, an area indicated by any one communication device, or an area meeting any other requirements of the communication devices.

The memory 207 is used for storing meeting place communication history of the at least two communication devices and related user preferences so as to determining the meeting place.

According to a disclosed embodiment, when calculating the meeting point or place, the processor 201 also takes user personal preference of the master user and the friends as a parameter. The user preference may include restaurant preference such as food style, price range, with music or not, restaurant capacity and so on. The food style may include Italian food, French food or Asia food and so on, and the music may also have different style, such as disco, classic music etc. The user preference may be stored in the memory 207 in advance, or can be input when launching the meeting request and responding to the meeting request by the friends. The user preference may also include coffee shop and bar with different style, cinema, park, or even shopping mall. According to a disclosed embodiment, the user preference may be received by the master user from selection of the at least one mobile communication device, or obtained from meeting place communication history of the at least one other communication device by the master user.

According to a disclosed embodiment, the meeting place for the master user and at least one mobile communication device is determined according to the present locations and user preferences, and then a navigation route from the present location of the master user to the determined meeting place is set by the master user. For example, the processor 201 obtains a tentative meeting area for the master user and the friends so as to select the meeting place in the tentative meeting area, and then obtains plural meeting place categories in the tentative meeting area. The meeting place categories include restaurant, coffee shop, cinema, park and so on. Then at least one meeting place category is selected by the processor 201 from the plural meeting place categories according to the user preference of the respective communication device. Alternatively the at least one meeting place category is selected from the plural meeting place categories by the respective communication device by sending the plural meeting place categories to users and receiving respective selection.

Then the user personal preference will be considered to get the candidate meeting points. At least one meeting place of the meeting place category in the tentative meeting area can be further selected as meeting place of users of these communication devices, by the processor 201 according to the user preference or by users of the communication devices. For example, the tentative meeting area is obtained based on a condition that they can meet each other fastest considering their transport devices, such as by car, train, but or by foot. This calculation method is known by one skilled in the art, and not discussed in details here.

For example, when the meeting place category is restaurant, and the user personal preference of the master user is restaurant with music, and his friend's preference is Italian food restaurant, then some Italian restaurant with music will be selected as candidate meeting points. Some candidate meeting places can be displayed to the master user and sent to the friends for manual selection. Finally at least one common meeting place can be obtained according to a specific rule, such as the meeting places selected by more people, the meeting place selected by the master user.

Determination of the last meeting place prompts the processor 201 of the master user to set different routes of the master user and the friends to the meeting place. The selected meeting place and the different route to the meeting place are transmitted to the friends. Alternatively, the processor 201 only gets a rout from the master user to the meeting point. After the slave users gets the meeting point from the master user, the navigation device of the slave users calculate their own rout from their current location to the meeting point.

Although the final meeting point or place is determined by selecting from the plural candidates meeting places manually in the above embodiment, it can also be determined by the master user automatically based on respective priorities. In addition, although the tentative meeting area, the plural meeting place categories, candidate meeting places, the last meeting place and the different routes from the present location to the meeting point are calculated by the processor 201, it is understood that these calculation can also be implemented in the service center 110.

Figure 4:
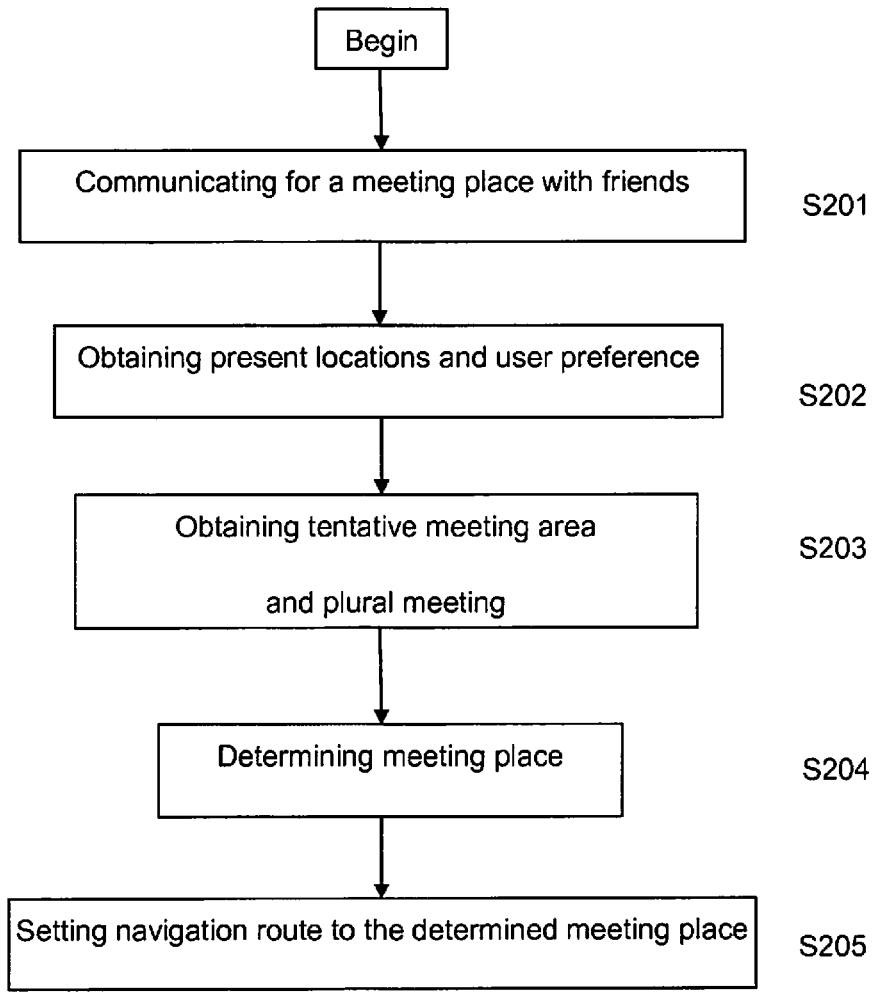
FIG. 4 is a flow chart for the vehicle communication method according to a disclosed embodiment.

FIG. 4 is a flow chart showing the navigation method in a communication device according to a disclosed embodiment. As shown in FIG. 4, at step 401 the communicating for a meeting place with friends is launched by a navigation communication device, that is, the vehicle on board communication device 102 in the vehicle communication system 100. The communicating for the meeting place comprises sending, by the master user, a meeting request to the communication device of friends, and receiving a corresponding response; or receiving a meeting request from one of the friends by the master user, and responding to accept the meeting request. Then at step 403 present locations and user preference of the master user and friends are received for the meeting place calculation.

At step 405 a tentative meeting area and plural meeting place categories in the tentative meeting area are obtained by the master user, and then a meeting place category is selected to determine the meeting place in the tentative meeting area. The final meeting place is determined at step 407. After the meeting place is determined, the navigation route from the present position to the meeting place is set by the master user at step 409. Here, the master user sets the navigation routes for the master user and friends, or the master user sends the meeting place to the friends and the navigation routes of the friends are set by their communication device.

Although a navigation communication device in a vehicle and the corresponding navigation method are introduced, the present navigation method is not limited to vehicle navigation device and method, but can be used in any communication device with navigation function. In addition, although the navigation method is introduced by the implementation in the vehicle, it can also be implemented by the service center 110. For example, a transceiver (not shown) of the service center 110 may receive, from the master user or one of the other mobile communication device, a meeting request, and then determine the meeting place using the same method implemented in the vehicle navigation device. When the service center 110 implement the meeting place calculation, the final meeting place may be selected by the service center 110 or by the mobile communication devices, and the navigation routes from the present locations to the meeting place can also be set by the service center 110 or by the mobile communication devices.

The foregoing merely illustrates the embodiment and it will thus be appreciated that those skilled in the art will be able to devise numerous alternative arrangements which, although not explicitly described herein, embody the principles of the disclosed embodiments and are within its spirit and scope.

The invention claimed is:

1. A navigation method for a first communication device, the navigation method comprising:
receiving, by transceivers of the first communication device and at least one second communication device, a present location of the first and the at least one second communication device;
retrieving, by a navigation controller of the first communication device, user preferences of the first and the at least one second communication devices stored on memories of the first and the at least one second communication devices;
determining, by the navigation controller, a list of a plurality of candidate meeting places for the first communication device and at least one second communication device according to the present locations of the first and the at least one second communication devices and the user preferences of the first and the at least one second communication devices;
sending, by the navigation controller, the list of the plurality of candidate meeting places to the at least one second communication device;
receiving, from the at least one second communication device, a selection for a final meeting place out of the list of the plurality of candidate meeting places;
determining, by the navigation controller, a determined meeting place based on a meeting place selected by the most communication devices of the first and the at least one second communication device; and
setting, by the navigation controller, a navigation route for the first communication device from the present location of the first communication device to the determined meeting place.

2. The navigation method of claim 1, wherein the determining of the list of the plurality of candidate meeting places comprises creating a tentative meeting area for the first and the at least second communication devices.

3. The navigation method of claim 2, further comprising selecting at least one meeting place category in the tentative meeting area according to the user preferences of the first and the at least one second communication devices.

4. The navigation method of claim 1, wherein the user preferences of the first communication device and the at least one second communication device are obtained from meeting place communication history by the first communication device.

5. The navigation method of claim 1, wherein the user preferences are selected by users of the first communication device and/or the at least one second communication device.

6. The navigation method of claim 3, wherein the at least one meeting place category is selected from plural meeting place categories by at least one user of the first and at least one second communication device.

7. The navigation method of claim 1, wherein the present locations of the first communication device and the at least one second communication device are obtained from a Global Positioning System (GPS) system by the first communication device.

8. The navigation method of claim 7, wherein the present location of the at least one second communication device is received by the first communication device from the at least one second communication device.

9. The navigation method of claim 1, wherein the first communication device is a vehicle navigation communication device.

10. A navigation communication device in a vehicle, the navigation communication device comprising:
a transceiver for communication of a meeting place with at least one communication device, wherein the transceiver receives a present location of the vehicle and another transceiver of the at least one communication device receives a present location of the at least one communication device, and wherein the transceiver receives user preferences of the at least one communication device; and
a processor for determination of a list of a plurality of candidate meeting places for the vehicle and the at least one communication device according to present locations of the vehicle and the at least one communication device and user preferences of a user of the vehicle and the at least one communication device,
wherein the processor is adapted to send the list of the plurality of candidate meeting places to the at least one communication device,
wherein the transceiver is adapted to receive a selection for a final meeting place out of the list of the plurality of candidate meeting places from the at least one communication device,
wherein the processor is adapted to determine a determined meeting place based on a meeting place selected by the most communication devices of the first and the at least one second communication device, and
wherein the processor is adapted to set a navigation route for the vehicle from the present location of the vehicle to the determined meeting place.

11. The navigation communication device of claim 10, wherein the processor is adapted to create a tentative meeting area for the vehicle and the at least one communication device.

12. The navigation communication device of claim 11, wherein the processor is adapted to select at least one meeting place category in the tentative meeting area according to the user preferences of the user of the vehicle and the at least one communication device.

13. The navigation communication device of claim 10, further comprising a memory for storing meeting place communication history of the at least one communication device and related user preferences to determine the meeting place.

14. A service center for providing navigation service in a communication system, the service center comprising:
a transceiver for communication of a meeting place for at least two communication devices in the communication system, wherein the transceiver is adapted to receive a present location of the at least two communication devices and user preferences of the at least two communication devices from transceivers of each of the at least two communication devices; and
a processor for determination of a list of a plurality of candidate meeting places for the at least two communication devices according to present locations and user preferences of each of the at least two communication devices,
wherein the processor is adapted to send the list of the plurality of candidate meeting places to the at least two communication devices, wherein the transceiver is adapted to receive a selection for a final meeting place out of the list of the plurality of candidate meeting places from the at least two communication devices, wherein the processor is adapted to determine a determined meeting place based on a meeting place selected by the most communication devices of the at least two communication devices, and wherein the processor is adapted to set a navigation route for each of the at least two communication devices from the present locations of each of the at least two communication devices to the determined meeting place.

15. The service center of claim 14, wherein the processor is adapted to create a tentative meeting area for the at least two communication devices.

16. The service center of claim 15, wherein the processor is adapted to select at least one meeting place category in the tentative meeting area according to the user preferences of each of the at least two communication devices.

17. The service center of claim 14, further comprising a memory for storing meeting place communication history of the at least two communication devices and related user preferences to determine the meeting place.

\* \* \* \* \*